United States Patent Office 2,704,737
Patented Mar. 22, 1955

2,704,737

UREA-MODIFIED INSULIN AND PROCESS FOR PREPARING

Fritz E. Bischoff, Santa Barbara, Calif.

No Drawing. Application August 14, 1950,
Serial No. 179,379

6 Claims. (Cl. 167—75)

This invention relates to a process of treating insulin in order to produce insulin which has a delayed physiological action. The invention also relates to the insulin having such delayed physiological action. This application is a continuation-in-part of my copending application Serial No. 106,484 filted July 23, 1949, now abandoned.

The advantages of an insulin which has a delayed physiological action are well known. By the use of an insulin having a delayed physiological action the patient is required to take fewer injections per day and less insulin per day. Previous to the present invention delay in physiological action has been dependent upon delay in resorption from the subcutaneous injection depot either by injecting an insulin combination which is highly insoluble or a mixture which will form a precipitate at the injection site. Such insulin combinations or precipitates when given intravenously have no delay in action for the precipitate is rapidly dispersed. In order to obtain a prolonged action protamine insulin has been developed which is slow acting. It has been the practice in some cases to give injections of both the normal, soluble and quick-acting insulin and the protamine insulin or prolonged action insulin. Many people, however, are allergic to protamine insulin and therefore such people cannot use a slow acting preparation which contains a protamine insulin.

I have discovered a process for treating the normal soluble quick-acting insulin by which a delayed physiological action can be obtained from such treated insulin whether the material is given intravenously or subcutaneously. Moreover, insulin products of the process of the present invention are soluble at the pH of the body fluids. They do not, therefore, function by delayed resorption. The product of the present invention avoids the disadvantages possessed by insoluble insulin preparations or insulin preparations that become insoluble at the injection site. Among the disadvantages of such insulin preparations which are avoided by the product of the present invention are (1) the tendency of suspensions to settle so that the patient will give himself a variable concentration; (2) the dependence of the resorption on the vascular bed of the injection site and its extreme variability with the rate of movement of the intracellular fluids; and (3) the irritating effect of the insoluble combinations which produce permanent local injury in some patients.

The product of the process of this invention possesses a delayed physiological action but the mechanism for such a delayed action is not yet known. It itself may not have a physiological action but may be reconverted to an active insulin in the body, or it may be less readily destroyed by the body than regular insulin. Whatever the mechanism the insulin preparation of the present invention is possessive of a delayed physiological action and at the same time free from the three objections cited for insoluble insulin.

The process of the present invention comprises treating insulin in a concentrated solution of either urea or methyl urea. The process is not to be confused with the mere coagulation of insulin by heat, which forms the so-called heat precipitated insulin—the insulin becoming insoluble and losing all biological activities. In the process of the present invention the treated insulin does not become insoluble and does not become biologically inactive. Furthermore, the process is not one of rendering the insulin partially denatured. If the ordinary soluble insulin is treated to kill, for example, 50% of its activities and then given in double the normal dose, it produces the same blood sugar curve of the original insulin. By the process of the present invention, however, the soluble insulin product retains substantially its total activity but produces less hypoglycemia in the initial period and more hypoglycemia in the final period. It is, therefore, possible to increase the dosage to compensate for loss in the initial period of activity and to increase the total activity.

In order to carry out the objects of the present invention in the treatment of soluble insulin by urea or methyl urea it is required that a concentrated solution of urea or methyl urea be used. Aqueous solutions of urea or methyl urea containing as little as 20% when used in the treatment of insulin produce improvements, if any, in delayed physiological action so slight as to be probably within experimental error so that to be effective the concentration of urea or methyl urea used in the process of the present invention should be above 20%. At concentrations of 30% a highly satisfactory delayed physiological action of the insulin is produced, and through the use of solutions of higher concentration, such as 40%, substantially equal results have been obtained. Concentrations as high as 72% have been employed with satisfactory results although the use of such concentrated solutions at room temperature is not feasible because it is only at a high temperature, such for example as 99° C., that urea is soluble in water to such an extent.

To obtain the desired delayed physiological action the insulin must be processed in urea solution at a suitable temperature and for a sufficient period of time. The treatment, moreover, should not be prolonged to the point at which the insulin will lose its biological activity. At temperatures of 25° C. or below no measurable effect on the delay in action of the insulin is obtained even after 22 hours of treatment. At temperatures of about 35° C. or higher, however, a highly significant effect is obtained in the delayed action of the insulin and the temperature treatment may be carried up to substantially the boiling point of water. The higher the temperature of the treatment the less time of treatment is required to obtain the desired significant delayed action. Thus at temperatures of around 37 to 38° C., I find 92 hours to be satisfactory in producing the desired action, while at temperatures as high as 99° C. an equally significant delayed action may be obtained with periods of treatment as low as 5 minutes. In general, it is found that 10° more in temperature speeds the reaction three times, or conversely, each 10° lower in the temperatures increases the time required for the reaction by three times. As contrasted with these treatments is the so-called heat precipitated insulin, an insoluble form of insulin having no physiological activity when insulin is treated at 99° C. for about 15 minutes or longer.

After the treatment of the insulin in the urea solution it may, in some cases, be possible after dilution to use the solution containing the treated insulin in the presence of the urea. However, normally the treated insulin should be separated from the urea or methyl urea. Such a separation may be carried out either by precipitation of the insulin at the isoelectric point or the urea may be removed by dialysis in membranes impervious to insulin but not to urea or methyl urea. The insulin so precipitated or purified possesses the delayed physiological activities.

The process of treating insulin of the present invention and the products produced by that process together with various further advantages of the invention will be more fully understood from the following description of a number of examples of the invention.

22.7 mg. Armour's crystalline insulin, 777 mg. urea and 1.22 cc. H₂O were admixed. The solution of insulin in aqueous urea was then raised to a temperature of 37 to 38° C. and held for 92 hours. Thereafter the product was diluted so that 1 cc. was equivalent to 10 original units. The pH of the solution was 7.4. The following tabulation is an assay by intravenous injection in 12 rabbits by cross matching with a control containing 10 units of insulin per cc.

| Blood sugar | 1.5 hr. | 3.0 hr. | 6.0 hr. |
|---|---|---|---|
| Control insulin | 45 | 86.5 | 115 |
| Urea treated insulin | 49.5 | 70.5 | 111 |
| Difference—std. dev. mean | −4.5±1.4 | ±16±2.6 | +4±0.9 |

In each of the assays therein stated each rabbit received both a control dose of insulin and an experimental dose. The assay was performed once a week for any one rabbit for either control or experimental dose. The amount of insulin given per rabbit depended upon the sensitivity of the rabbit to insulin as gauged by trial doses of regular insulin. A convulsive dose was avoided as well as a relatively ineffective dose. Unless otherwise noted the experimental dose of insulin given per rabbit was exactly the same as the control dose based on the potency of the original insulin used. Blood sugars were performed upon blood drawn from the marginal ear vein at the time indicated and were performed upon Folin Wu filtrates by the method of Shaffer and Hartman.

Interpreting the results it should be borne in mind that increase in dosage has the effect of delayed resorption. To illustrate this the following tabulation illustrates the effect of increasing an intravenous dose of regular insulin by 33%, the experiment being performed upon 9 rabbits:

| Blood sugar level | 1.5 hr. | 3.0 hr. | 6.0 hr. |
|---|---|---|---|
| Insulin dose equivalent to 1.00 | 51 | 98 | 114 |
| Insulin dose equivalent to 1.33 | 47 | 88 | 115 |
| Difference + std. dev. mean | 4±1.1 | 10±1.5 | −1±1.5 |

The standard deviation of the mean is $$\sqrt{\frac{\epsilon d^2}{n(n-1)}}$$

where $d$ is each individual difference from the mean and $n$ is the number of animals.

The pronounced delayed effect is noted for the third and even the sixth hours.

The following assay data for 8 rabbits illustrates the action of the insulin when given subcutaneously.

| Blood Sugar level | 3 hrs. | 6 hrs. | 9 hrs. |
|---|---|---|---|
| Control insulin | 37 | 85 | 116 |
| Urea treated insulin | 42 | 59 | 97 |
| Difference+std. dev. mean | −5±2.5 | +26±5 | +19±7 |

I have been unable to note any effect on the process or product of the present invention created by varying the concentration of insulin in urea solution during the process of treatment. On the basis of water content, amounts of insulin ranging from 0.8% to 12.4% of the water content of the reaction mixture have given successful delaying action insulins.

As another example of the invention a control solution of insulin was made by taking 1.0 cc. of water and adding 667 mg. of urea and heating the mixture for 10 minutes at 99° C. Thereafter cooling, water and 1.0 cc. of Armour's insulin containing 240 units were diluted so that 1 cc. contained 5 units. An urea treated insulin was produced as follows: 1 cc. of the Armour's insulin, pH 8.5 and 667 mg. of urea were heated 10 minutes at 99° C. Thereafter cooling water was added so that final concentration was 5 units per cc. The pH after heating was 8.1. The pH of both the control solution and the urea treated solution was then adjusted to 7.4. With the above control insulins and the urea treated insulins the following assays were performed using 10 to 12 rabbits per comparison:

(a) Comparing equal doses of control and urea treated insulin when given subcutaneously.

(b) Comparing 2 control dose levels, differing by from 25 to 50% when given subcutaneously.

(c) Comparing control and urea treated insulins given subcutaneously when the urea treated dose is 25 to 50% over that of the control.

(d) Comparing equal doses of control and urea treated insulins when given intravenously.

| Blood sugar level | 1.5 hr. | 3.0 hr. | 6.0 hr. | 9.0 hr. | 11 hr.* |
|---|---|---|---|---|---|
| Control, subcutaneous | 55 | 44 | 62 | 112 | |
| Urea treated, subcutaneous | 63 | 51 | 62 | 95 | |
| Difference + std. dev. mean | −8±3 | −7±2.3 | 0−±3 | 17±3.6 | |
| Control, subcutaneous | | 50 | 68 | 115 | |
| Control 25 to 50% greater dose subcutaneous | | 43 | 56 | 91 | |
| Difference + std. dev. mean | | +7±1.9 | +12±6 | +24±11 | |
| Control, subcutaneous | | 49 | 68 | 115 | 115 |
| Urea treated 25 to 50% greater dose subcutaneous | | 54 | 54 | 75 | 91 |
| Difference + std. dev. mean | | −5±1.6 | 14±4 | 40±4.5 | 24±2.4 |
| Control, intravenous | 54 | 92 | 115 | | |
| Urea treated, intravenous | 51 | 73 | 108 | | |
| Difference + std. dev. mean | +3±0.8 | +19±2.4 | +7/+1.0 | | |

* Comparison of 8 rabbits.

In order to measure the relative amounts of insulin acting at any period for my new insulin, the dose may be varied in relation to the control to correspond to the effect of a greater or lesser amount of control insulin. The following experiment performed upon 12 rabbits illustrates this point. The insulins were given intravenously.

| Blood sugar level | 1.5 hr. | 3.0 hr. | 6.0 hr. |
|---|---|---|---|
| Control insulin, dose ○ 1.0 | 48 | 88 | 115 |
| Control insulin, dose ○ 0.75 | 50 | 97 | 114 |
| Urea treated insulin, dose ○ 1.0 | 58 | 83 | 113 |
| Urea treated insulin, dose ○ 1.25 | 53 | 72 | 108 |

In order for the experimental insulin to produce a fall in blood sugar comparable to the regular insulin at 1.5 hrs., it was necessary to increase the dose 67%.

In a further test 11.3 mg. Armour's insulin, 671 mg. urea and 1.0 cc. H₂O were heated 10 minutes at 99° C. After cooling, 13 cc. absolute ethanol and N/10 HCl were added to take the pH to the precipitation point. After cooling in an ice chest the precipitated insulin was removed by centrifugation. To the filtrate an equal volume of absolute ethanol was added and more N/10 HCl was added to cause further precipitation. After cooling the precipitate was removed by centrifugation. The combined precipitates were taken to a final volume in isotonic saline, pH adjusted to 8.0 so that 1 cc. was equivalent to 5 original units. By this procedure the urea treated insulin was completely separated from the urea used in the treatment. The following assay on 12 rabbits was carried out by comparison with a control containing 5 units of insulin per cc. of approximately the same ionic strength. The insulin was given intravenously.

| Blood sugar level | 1.5 hr. | 3.0 hr. | 6.0 hr. |
|---|---|---|---|
| Control insulin | 52 | 96 | 116 |
| Urea treated insulin | 62 | 88 | 112 |
|  | −10±2 | 8±2 | 4±1 |

In another series of similar experiments there was established that the air drying of the precipitated and washed urea treated ethanols retained the delayed physiological action as indicated in the previous assays.

Another series of experiments was carried out using 30% urea solution and 2.4% insulin (based on the water content) at 99° C. for a 10 minute heating period. It was found that 30% urea solution was substantially as effective as 40 to 72% urea concentrations in developing the delayed action insulin.

Another experiment was performed in 72% urea solution at 99° C., heating for a 5 minute period. After cooling and adding 30 parts of water, the pH of the solution was 7.8. Dilute HCl was added to pH 5.5 (glass electrode). The precipitated insulin was removed by centrifugation. It was made up in isotonic saline solution at pH 6.5 (glass electrode), in which it was completely soluble, to contain an equivalent of 11.5 units per cc. based on its tyrosine content. It was compared with a control insulin made up in isotonic saline to contain 10.0 units per cc. based on the tyrosine content. The assay was performed by cross matching on 10 rabbits by subcutaneous injection. The results follow:

| Blood sugar level | 3 hr. | 6 hr. | 9 hr. |
|---|---|---|---|
| Control | 43.2 | 90 | 114 |
| Experimental | 46.6 | 67 | 99 |
|  | −3.4±1.7 | 23±8.2 | 15±4.6 |

On this basis the effect was less the 3rd hour and considerably greater the 6th and 9th hours.

While the duration of treatment at lower tmeperatures apparently can be continued as long as desired without damage to the process when the process of the present invention is carried out at temperatures of around 99° C., the duration of treatment of over about 10 or 15 minutes is not recommended. Duration of treating as high as 30 minutes at 99° C. while producing products having noticeable delayed action, the extent of the improvement effected by the process is markedly less than that obtained with 10 minutes' duration of treatment since there is some destruction of the insulin. It is further established experimentally that the pH of solution during the process is not critical, if the alkalinity does not exceed that at which the potency of insulin is destroyed. An insulin having an initial pH of 4.0 gave a perfectly satisfactory result. During the process of heating at 99° C. some urea hydrolyzed to give a final pH of 8.5. In our experiments giving satisfactory results, the pH during reaction has ranged from pH 4.0 to that giving a pink color with phenolphthalein.

A similar series of experiments have been carried out using methyl urea in place of urea solution. These experiments indicated methyl urea is substantially equally effective with urea in producing the desired action but would indicate that with methyl urea a somewhat greater time of treatment is desirable. As indicated with methyl urea treatment for 5 minutes at 100° C. produces results of doubtful significance, whereas treatments for 10 minutes at 100° C., and for 20 minutes at 100° C. provide results highly significant. The following examples illustrate this.

*Example No. 1*

17.5 mg. crystalline insulin and 1 cc. of a 56% aqueous solution of methyl urea were heated for 5 minutes at 100° C. The clear reaction product was cooled, diluted with 5 cc. H₂O (pH 7) and subjected to isoelectric precipitation with N/10 HCl. The precipitate was taken up in isotonic saline and taken to pH 6.4 with N/10 HaOH. The concentration of insulin was determined by the Folin Ciocalteu phonol reaction using crystalline insulin solution as a standard. For bioassay the volume was adjusted so that 1 cc. contained the equivalent of 10 units of untreated insulin. The final pH was 7.7.

*Example No. 2*

To 1.5 cc. of a solution of crystalline insulin containing 230 units per cc. was added 0.17 cc. N/10 NaOH. This produced an isoelectric precipitate. 2.0 gm. methyl urea were added. The mixture which cleared was heated 10 minutes at 100° C., cooled, and diluted with 7.0 cc. H₂O, pH 7.4. The insulin was precipitated isoelectrically adding 10 and 5 cc. portions of H₂O. The assay solution was prepared as in Experiment 1.

*Bioassay.*—12 rabbits were cross matched for the bioassay of each insulin, which was given intravenously. The 0.75 hour blood sugar value was determined by an additional cross matching.

| Blood sugar level | 0.75 hr. | 1.5 hr. | 3.0 hr. | 6.0 hr. |
|---|---|---|---|---|
| Ex. 1: |  |  |  |  |
| Control | 47 | 56 | 95 | 125 |
| Experimental | 52 | 54 | 84 | 123 |
|  | −5±2.5 | +1.6±2.3 | +11±5.2 | +2±1.8 |
| Ex. 2: |  |  |  |  |
| Control | 52.5 | 52.5 | 94 | 118 |
| Experimental | 58.3 | 56.5 | 78 | 117 |
|  | −5.8±1.8 | −4±2.5 | +16±4.4 | 1±2.0 |

The results of Experiment 1 in which the insulin was heated for 5 minutes in 56% methyl urea solution are doubtfully significant, but highly suggestive.

In Experiment 2 in which the experimental conditions are essentially the same as in experiment 1 with the exception of the heating period which was doubled, the results are highly significant and similar to those obtained with urea.

*Example No. 3*

20.5 mg. crystalline insulin, 813 mg. methyl urea and 500 mg. water formed a clear solution at room temperature. The solution was heated 20 minutes at 100° C. then cooled and 20 cc. H₂O added. The pH was 8.3 by the glass electrode. The insulin was precipitated isoelectrically with 0.21 cc. N/10 HCl. It was removed from the methyl urea solution by centrifugation. This precipitate was dissolved by the use of N/10 NaOH and taken to such a volume in isotonic saline solution that its tyrosine content by the Folin Ciocalteu reaction was equal to that of a regular U 10 insulin solution. The pH of the experimental solution was 7.4 and contained 0.3% tri cresol as a preservative.

Assayed by cross matching in 12 rabbits and given by the intravenous route, the blood sugars follow:

| Blood sugars | 0.75 hr. | 1.5 hr. | 3 hr. | 6 hr. |
|---|---|---|---|---|
| Control insulin | 52 | 56 | 89 | 122 |
| Methyl urea insulin | 58 | 57 | 75 | 114 |
|  | −6±2.6 | −1±2.8 | +14±3.1 | +8±4.2 |

The above assay shows that the methyl urea treated insulins produce an initial delay followed by a prolonged effect just as is the case with the urea treated insulins. In this example there is clearly no loss in potency. The process of the present application is applicable to soluble insulin and not to a protamine insulin and in the accompanying claims the term "insulin" is not to be construed as including a protamine insulin.

While the examples herein given of the process of the present invention are well adapted for producing a delayed physiological action in insulin, various modifications and changes may be made and this invention is of the scope set forth in the appended claims.

I claim:

1. A process of treating insulin to obtain a soluble insulin having a delayed physiological action which comprises heating insulin in a concentrated aqueous solution of a member of the group consisting of urea and methyl urea to produce the desired delay in action, the member being in a concentration of above 20%, and isoelectrically precipitating the insulin from the member solution.

2. A process of treating insulin to obtain a soluble insulin having a delayed physiological action which process comprises heating insulin in a concentrated aqueous solution of a member of the group consisting of urea and methyl urea to produce the desired delay in action, the member being in a concentration of above 20%, and isoelectrically precipitating the insulin from the member solution and drying the same.

3. A process of treating insulin to obtain a soluble insulin having a delayed physiological action which process comprises heating insulin in a concentrated aqueous solution of a member of the group consisting of urea and methyl urea to produce the desired delay in action, the member being in a concentration of above 20%, and separating the insulin from the member solution by ethanol precipitation of the insulin.

4. A process of treating insulin to obtain a soluble insulin having a delayed physiological action which process comprises heating insulin in a concentrated aqueous solution of a member of the group consisting of urea and methyl urea to produce the desired delay in action, the member being in a concentration of above 20%, and separating the insulin from the member solution by dialysis.

5. A soluble delayed action insulin derived by treating insulin in a concentrated solution, of a member of the group consisting of urea and methyl urea, the member being above 20% in concentration and the solution being heated in the process to between 35° C., and the boiling point of the solution, the treated insulin being separated from the member.

6. A process of preparing a soluble delayed action insulin product, which process comprises heating insulin in a concentrated aqueous solution of a member of the group consisting of urea and methyl urea, the member being in a concentration of above 20%, the treatment being carried out at a temperature of between 35° C. and the boiling point of the solution, then separating the insulin from the member solution.

References Cited in the file of this patent

UNITED STATES PATENTS 2,343,625    Abramson _____ Mar. 7, 1944

FOREIGN PATENTS 504,721    Great Britain _____ Apr. 26, 1939

OTHER REFERENCES

Hawk: "Practical Physiological Chemistry," p. 163, 12th ed., 1947.

Lang, in Pharm. Arch. 12 (1941), pp. 81–87.

Pharmaceutical Activities at I. G. Farb. Hochst on Main, July 1945, as contained in Office Publication Board Report, No. PB–981, pp. 48–52.